United States Patent
Hegde et al.

(10) Patent No.: US 10,911,557 B2
(45) Date of Patent: Feb. 2, 2021

(54) MIRACAST SOURCE PROVIDING NETWORK SERVICE ACCESS FOR A MIRACAST SINK

(71) Applicant: Microsoft Technology Licensing, LLC, Redmond, WA (US)

(72) Inventors: Uday Hegde, Redmond, WA (US); Sunil Pai, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 636 days.

(21) Appl. No.: 15/416,974

(22) Filed: Jan. 26, 2017

(65) Prior Publication Data
US 2018/0213049 A1 Jul. 26, 2018

(51) Int. Cl.
G06F 15/16 (2006.01)
H04L 29/08 (2006.01)
H04L 29/06 (2006.01)

(52) U.S. Cl.
CPC ............ H04L 67/28 (2013.01); H04L 67/104 (2013.01); H04L 67/141 (2013.01); H04L 67/2814 (2013.01); H04L 65/4069 (2013.01)

(58) Field of Classification Search
CPC ......... H04L 65/4069; H04L 2012/2841; H04L 67/28; H04L 67/141; H04L 67/104
See application file for complete search history.

(56) References Cited

U.S. PATENT DOCUMENTS

| | | | |
|---|---|---|---|
| 7,500,269 B2 | 3/2009 | Huotari et al. | |
| 9,065,876 B2 | 6/2015 | Huang et al. | |
| 9,412,332 B2 | 8/2016 | Smadi et al. | |
| 2004/0032876 A1* | 2/2004 | Garg | H04L 12/2856 370/443 |

(Continued)

OTHER PUBLICATIONS

"Wi-Fi Certified Miracast (TM): Extending the Wi-Fi Experience to Seamless Video Display", Retrieved from:<<https://web.archive.org/web/20121115150316/https://www.wi-fi.org/sites/default/files/uploads/wp_Miracast_Industry_20120919.pdf>>, Sep. 19, 2012, 18 Pages.

(Continued)

*Primary Examiner* — Oleg Survillo
(74) *Attorney, Agent, or Firm* — Ray Quinney & Nebeker P.C.; John O. Carpenter

(57) ABSTRACT

Techniques are described for providing and accessing network services via a peer-to-peer wireless network connection which is established between a first computing device and a second computing device. The first computing device has an additional network connection that allows it to access network services via external networks (e.g., the internet). The second computing device is only connected to the peer-to-peer wireless network connection and has no Internet access. A primary data channel is established between the first and second computing devices over the peer-to-peer wireless network connection (e.g., for streaming audio and/or video content). A secondary data channel is negotiated between the first computing device and the second comput- (Continued)

ing device. The secondary data channel is used by the second computing device to access the network services via the first computing device which performs relay and/or proxy operations for the second computing device.

16 Claims, 9 Drawing Sheets

(56) References Cited

U.S. PATENT DOCUMENTS

| | | | | |
|---|---|---|---|---|
| 2010/0268832 | A1* | 10/2010 | Lucas | H04L 65/1043 |
| | | | | 709/228 |
| 2012/0314713 | A1 | 12/2012 | Singh et al. | |
| 2013/0185548 | A1* | 7/2013 | Djabarov | G06F 21/572 |
| | | | | 713/2 |
| 2014/0026068 | A1 | 1/2014 | Park et al. | |
| 2014/0096164 | A1 | 4/2014 | Bei et al. | |
| 2014/0201415 | A1 | 7/2014 | Huang et al. | |
| 2014/0328251 | A1* | 11/2014 | Hassan | H04L 12/2818 |
| | | | | 370/328 |
| 2014/0351477 | A1 | 11/2014 | Lee et al. | |
| 2014/0365611 | A1* | 12/2014 | Praveenkumar | H04L 69/24 |
| | | | | 709/219 |
| 2015/0095510 | A1 | 4/2015 | Bhorkar et al. | |
| 2016/0188279 | A1 | 6/2016 | Rajamani et al. | |
| 2016/0249357 | A1* | 8/2016 | Green | H04W 24/08 |
| 2017/0171255 | A1* | 6/2017 | Wu | H04L 63/08 |
| 2018/0063299 | A1* | 3/2018 | Genossar | H04L 12/2863 |
| 2018/0213421 | A1* | 7/2018 | Horvitz | H04W 24/08 |
| 2019/0281646 | A1* | 9/2019 | Ogawa | H04W 76/14 |

OTHER PUBLICATIONS

"International Search Report and Written Opinion Issued in PCT Application No. PCT/US2018/013040", dated Mar. 29, 2018, 13 Pages.

Stockhammer, et al., "H.264/AVC in Wireless Environments", In Journal of IEEE transactions on Circuits and Systems for Video Technology, vol. 13, Issue 7, Jul. 2003, pp. 657-673.

Beule, Jan De, "Content sharing, syncing, streaming protocols for Wi-Fi", https://www.excentis.com/blog/content-sharing-syncing-streaming-protocols-wi-fi, Published on: Aug. 12, 2014, 8 pages.

Funai, et al., "Supporting Multi-hop Device-to-Device Networks Through WiFi Direct Multi-group Networking", In Journal of the Computing Research Repository, Jan. 2016, 7 pages.

Microsoft, "[MS-WDHCE]: Wi-Fi Display Protocol: Hardware Cursor Extension," <https://winprotocoldoc.blob.core.windows.net/productionwindowsarchives/MS-WDHCE/[MS-WDHCE].pdf> 21 pages (Jul. 14, 2016).

Blogs.msmvps.com, "Update Your Microsoft Wireless Display Adapter Firmware," <http://blogs.msmvps.com/connectedhome/2015/06/08/update-your-microsoft-wireless-display-adapter-firmware/>, 3 pages (Jun. 8, 2015).

* cited by examiner

MIRACAST SOURCE PROVIDING NETWORK SERVICE ACCESS FOR A MIRACAST SINK

BACKGROUND

Computing devices increasingly need access to network services to operate. For example, computing devices may need to communicate with services on the Internet to send and/or receive data. However, there are some types of computing devices that have no Internet connectivity. For example, some multimedia devices (e.g., audio-video streaming dongles) may only be able to communicate with directly connected devices.

Providing such computing devices that have no Internet connectivity can be attractive in terms of cost and simplicity. For example, a low-cost computing device can be developed for a specific task (e.g., audio-video streaming) that only supports a direct wireless connection to another computing device. However, due to this limited network connectivity, such devices have some significant limitations. For example, such devices may have no way to update software or otherwise communicate with outside network services (e.g., located on an intranet or the Internet).

Therefore, there exists ample opportunity for improvement in technologies related to providing network services for computing devices with limited connectivity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for providing network services over peer-to-peer wireless network connections using secondary data channels. For example, a peer-to-peer wireless network connection can be established between a first computing device and a second computing device in which the second computing device has no Internet access. A primary data channel can be established over the peer-to-peer wireless network connection. A secondary data channel can be negotiated over the same peer-to-peer wireless network connection. The secondary data channel can be used by the second computing device to access network services via the first computing device over the peer-to-peer wireless network connection. For example, the first computing device can perform relay and/or proxy operations to send and/or receive data from external network connections (e.g., the Internet) on behalf of the second computing device.

As another example, a Miracast peer-to-peer wireless network connection can be established between a source computing device and a sink computing device. A primary stream can be established over the Miracast connection for streaming audio-video data from the source computing device to the sink computing device. A secondary stream can be negotiated over the same Miracast peer-to-peer wireless network connection. The secondary stream can be used by the sink computing device to access network services via the source computing device over the Miracast peer-to-peer wireless network connection. For example, the source computing device can perform relay and/or proxy operations to send and/or receive data from external network connections (e.g., the Internet) on behalf of the sink computing device.

As described herein, a variety of other features and elements can be incorporated into the technologies separately and/or in combination.

DETAILED DESCRIPTION

Overview

Figure 1:
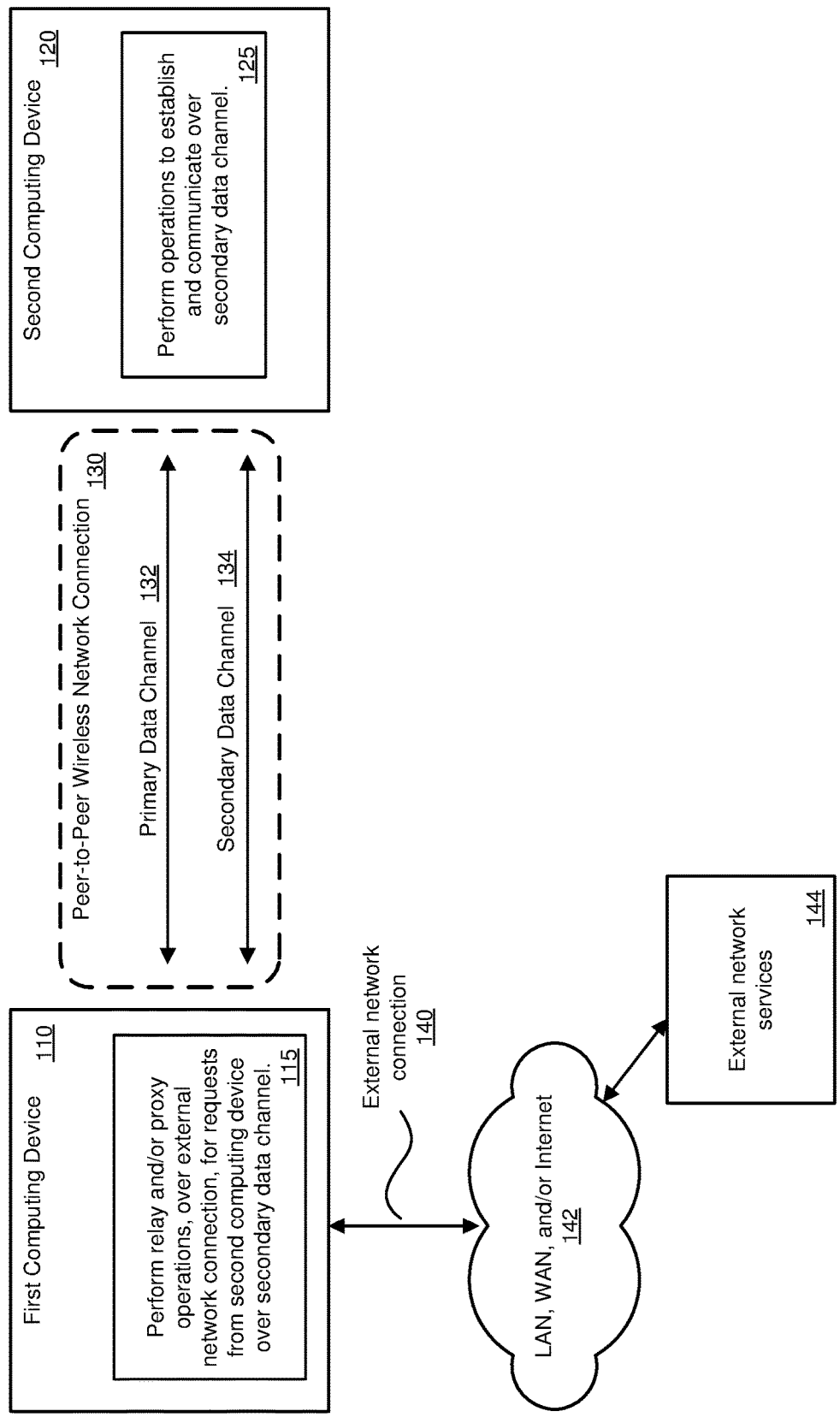
FIG. 1 is diagram depicting an example peer-to-peer wireless network connection between two computing devices supporting relay and/or proxy operations over a secondary data channel.

As described herein, various technologies are described for providing network services via a peer-to-peer wireless network connection. The peer-to-peer wireless network connection is established between a first computing device (e.g., acting as a source device, such as a Miracast™ source device, Miracast is a standard from the Wi-Fi Alliance®) and a second computing device (e.g., acting as a sink device, such as a Miracast sink device). The first computing device has an additional network connection that allows it to also connect to an external network (e.g., to the Internet) in addition to the peer-to-peer wireless network connection. However, the second computing device only has one network connection configured for peer-to-peer wireless networking (e.g., a Wi-Fi® interface dedicated to peer-to-peer wireless network connections, such as a dedicated Miracast Wi-Fi interface) and therefore is unable to access external networks such as the Internet.

The peer-to-peer wireless network connection established between the first and second computing devices supports a primary data channel (also called a primary stream or path) for communicating data between the first and second computing devices. For example, with a Miracast peer-to-peer wireless network connection, the primary data channel is a Miracast channel for streaming audio-video data (e.g., for remote streaming of audio and/or video content from the first computing device to a display associated with the second computing device).

The technologies described herein support establishment of a secondary data channel (also called a secondary stream or path) over the same peer-to-peer wireless network connection that can be used for communicating data between the first and second computing devices. While the secondary data channel is established over the same peer-to-peer wireless network connection, it carries data separate from the primary data channel (e.g., it is established over different network ports from the primary data channel).

The secondary data channel supports communication between the second computing device and external networks (e.g., the Internet). For example, the second computing device can send requests for network services to the first computing device over the secondary data channel. The requests can be communicated by the first computing device, acting as a relay and/or proxy, to external networks (e.g., to the Internet). In turn, the first computing device can receive responses back from the network services and communicate the responses back to the second computing device via the secondary data channel.

Some types of wireless computing devices only support network connectivity by way of a peer-to-peer wireless network connection and as a result have no way to directly connect to the Internet or other external networks (e.g., other local area networks (LANs) or wide area networks (WANs)). An example type of peer-to-peer wireless network connection is a Wi-Fi Direct® connection in which two devices connect directly via Wi-Fi without the need for an Internet connection or wireless access point. Other types of peer-to-peer wireless network connections can be used as well, such as direct peer-to-peer connections via standard Wi-Fi, Bluetooth®, and WiGig™. Examples of computing devices that only support peer-to-peer wireless network connections (and have not Internet connectivity) are Miracast dongles (also called Miracast sink dongles) and Miracast displays (e.g., a television with built-in Miracast technology that only supports Miracast network connections).

Computing devices that only support peer-to-peer wireless network connections, and that have no Internet access, cannot make use of various network services provided by the Internet. For example, such computing devices would not be able to communicate with network services located on other networks, and would only be able to communicate with the computing device at the other end of the peer-to-peer wireless network connection. This limits the functionality that such computing devices can provide. For example, such computing devices cannot send or receive data from the Internet (e.g., for sending diagnostic information or retrieving software updates).

Using the technologies described herein, computing devices that only support peer-to-peer wireless network connections can send and receive data to external networks (e.g., the Internet) by way of a secondary data channel negotiated over peer-to-peer wireless network connections. This can provide improvements in terms of security. For example, a peer-to-peer wireless network connection (e.g., using Miracast or another peer-to-peer wireless connection standard) can be established between two computing devices that is authenticated (e.g., using a pin code, Wi-Fi Protected Setup™ (WPS), or another authentication procedure) and secure (e.g., using Wi-Fi Protected Access® II (WPA2) or another security protocol). Improvements in performance can also be realized. For example, a peer-to-peer wireless network connection can communicate data over a primary data channel (e.g., for streaming audio and/or video content) while a secondary data channel is established for communicating other information. In this way, usage of the secondary data channel does not interfere with data being communicated via the primary data channel (e.g., streaming audio and/or video is not interrupted or degraded). Improvements in access to external networks (e.g., the Internet) can also be realized. For example, a computing device that only supports peer-to-peer wireless network connections and that would otherwise be unable to access external network such as the Internet can be provided with a secondary data channel that allows the computing device on the other end of the connection to operate as a relay and/or proxy to external networks (e.g., the Internet and/or other external networks reachable by the computing device at the other end of the peer-to-peer wireless network connection).

Environments Supporting Secondary Data Channels Over Peer-to-Peer Wireless Network Connections In the technologies described herein, computing environments can be provided supporting communication using secondary data channels over peer-to-peer wireless network connections between computing devices. For example, a first computing device can establish a peer-to-peer wireless network connection with a second computing device. Primary and secondary data channels can be created over the peer-to-peer wireless network connection. The first computing device can perform relay and/or proxy operations for network service requests from the second computing device over the secondary data channel.

FIG. 1 is a diagram 100 depicting an example peer-to-peer wireless network connection between two computing devices supporting relay and/or proxy operations over a secondary data channel. In the diagram 100, a first computing device 110 is connected to a second computing device 120 via a peer-to-peer wireless network connection 130. In some implementations, the first computing device 110 is called a source computing device (e.g., where the first computing device 110 is a streaming source, such as a Miracast streaming source, for audio and/or video content). The first computing device 110 can be any type of computing device, such as a laptop, tablet, smart phone, personal computer, etc. The first computing device 110 supports the peer-to-peer wireless network connection 130 via a wireless network interface (e.g., Wi-Fi, Wi-Gig, Bluetooth, or another type of wireless technology supporting peer-to-peer wireless network connections). The first computing device 110 also supports an external network connection 140 via a network interface. The network interface connecting to the external network connection 140 can be a wireless network interface (e.g., the same Wi-Fi or Wi-Gig network interface that supports the peer-to-peer wireless network connection 130 or a different wireless network interface, such as a cellular network connection or another Wi-Fi or Wi-Gig connection) or a wired network interface (e.g., an Ethernet connection).

The external network connection 140 allows the first computing device 110 to communicate with external networks (other than the peer-to-peer wireless network connection 130), such as local-area networks (e.g., computing devices on a local network of a home or business), wide-area networks (e.g., remote computing devices accessible via network connections to remote locations), and/or the Internet 142 (e.g., via networking devices such as routers or gateways that connect to an Internet service provider).

Using the external network connection 140, the first computing device 110 communicates with external network services 144. The external network services 144 are computing resources that that the first computing device 110 can communicate with when sending and/or receiving data. For example, the external network services 144 can include time services (e.g., network time protocol (NTP) servers), email services (e.g., servers supporting simple mail transfer protocol (SMPT)), messaging services (e.g., supporting instant messaging), data logging services (e.g., for sending diagnostic and/or usage information), file services (e.g., for sending and/or retrieving files, such as software or firmware updates), an advertisement and/or announcement service, a wallpaper of the day service, a quote of the day service, or any other type of network service or resource.

The second computing device 120 is a computing device that is only connected to the peer-to-peer wireless network connection 130 and therefore cannot access the Internet. For example, the second computing device 120 can be a remote display dongle or a computing device with built-in remote display technology for receiving remotely streamed audio and/or video content from the first computing device 110. In some implementations, the second computing device 120 is called a sink computing device (e.g., where the second computing device 120 is a streaming sink, such as a Miracast streaming sink, for audio and/or video content). In some implementations, the second computing device 120 is a Miracast device (e.g., a Miracast dongle attached to a display, such as a television, or a Miracast enabled computing device such as a display with built-in Miracast technology). In some implementations, the second computing device 120 only has one network interface that only supports the peer-to-peer wireless network connection 130. In some implementations, the second computing device 120 has other network interfaces which are not in use.

The second computing device 120 performs operations to establish and communicate over the secondary data channel 134, as depicted at 125 (e.g., via a software and/or firmware component of the second computing device 120). For example, the second computing device 120 can receive a request from the first computing device 110 to establish the peer-to-peer wireless network connection 130 and the primary data channel 132 (e.g., using Wi-Fi Direct or another peer-to-peer wireless protocol). The second computing device 120 can then negotiate the secondary data channel 134 over the same peer-to-peer wireless network connection 130 that the primary data channel 132 is using. For example, the second computing device 120 can connect to a network port at the first computing device 110 that is associated with (e.g., exclusively associated with) the secondary data channel 134. The secondary data channel 134 can also be established in other ways (e.g., the first computing device 110 and/or second computing device 120 can advertise support for the secondary data channel 134 and receive a connection request from the other side).

Once the secondary data channel 134 has been negotiated, the second computing device 120 can use it to access the external network services 144 via the external network connection 140 of the first computing device 110. In order to provide the access, the first computing device 110 performs relay and/or proxy operations over the external network connection 140 for requests from the second computing device 120 received via the secondary data channel 134, as depicted at 115 (e.g., via a software and/or firmware component of the first computing device 110). As an example, the second computing device 120 can send a request to the first computing device 110 over the secondary data channel 134 to an NTP server on the Internet (one of the external network services 144). The first computing device 110 can relay or proxy the request to the NTP server, receive a response from the NTP server, and relay or proxy the response back to the second computing device 120 via the secondary data channel 134.

Figure 2:
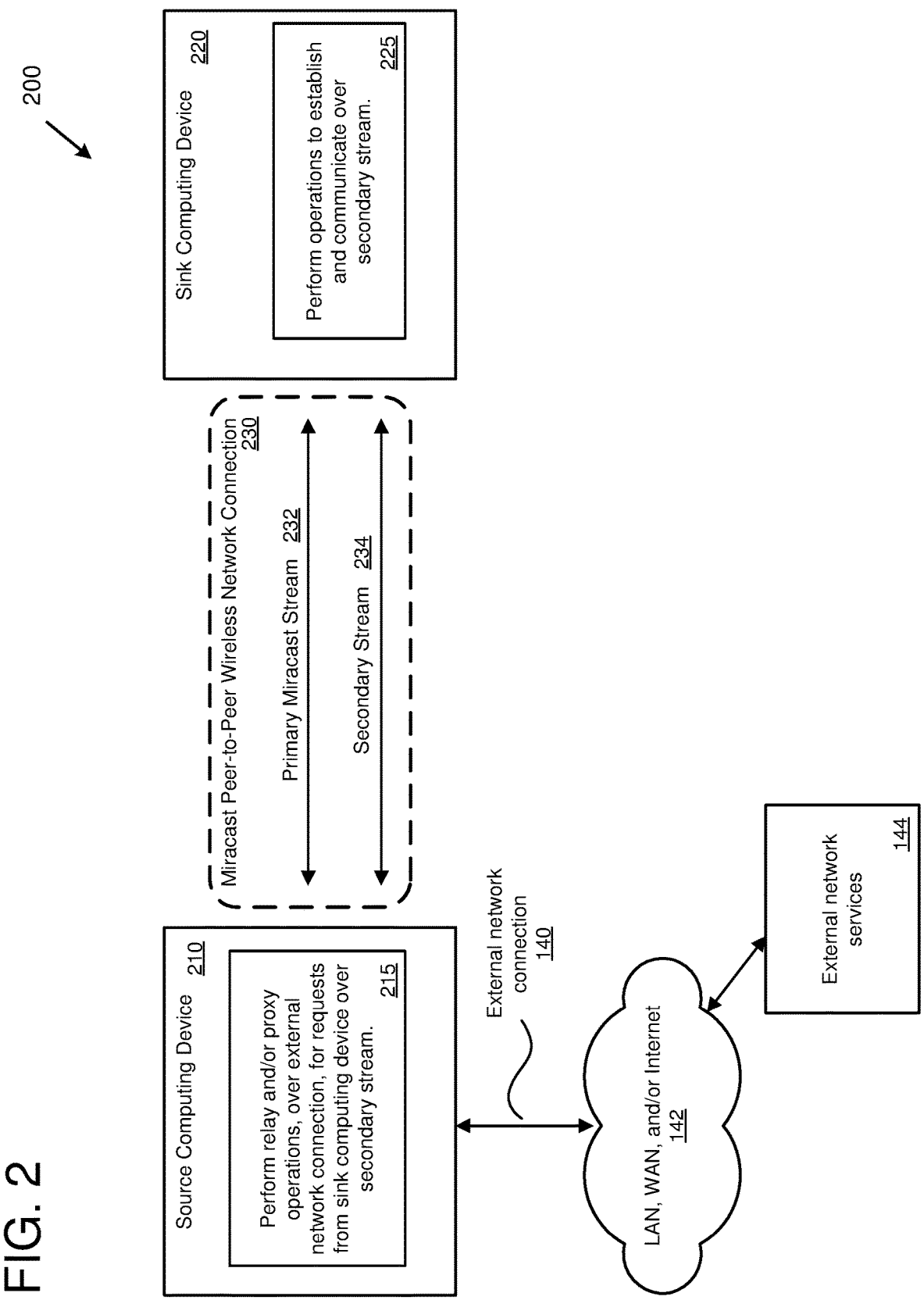
FIG. 2 is diagram depicting an example Miracast peer-to-peer wireless network connection between two computing devices supporting relay and/or proxy operations over a secondary stream.

FIG. 2 is a diagram 200 depicting an example Miracast peer-to-peer wireless network connection between two computing devices supporting relay and/or proxy operations over a secondary stream. In the diagram 200, a source computing device 210 (a transmitting-side or "source" for Miracast audio-video streaming) is connected to a sink computing device 220 (a receiving-side or "sink" for Miracast audio-video streaming) via a Miracast peer-to-peer wireless network connection 230. The source computing device 210 can be any type of computing device, such as a laptop, tablet, smart phone, personal computer, etc. The source computing device 210 supports the Miracast peer-to-peer wireless network connection 230 via a wireless network interface (e.g., Wi-Fi, Wi-Gig, or another type of wireless technology supporting Miracast peer-to-peer wireless network connections). The source computing device 210 also supports an external network connection 140 via a network interface. The network interface connecting to the external network connection 140 can be a wireless network interface (e.g., the same Wi-Fi or Wi-Gig network interface that supports the Miracast peer-to-peer wireless network connection 230 or a different wireless network interface such as a cellular network connection) or a wired network interface (e.g., an Ethernet connection).

The external network connection 140 allows the source computing device 210 to communicate with external networks (other than the Miracast peer-to-peer wireless network connection 230), such as local-area networks (e.g., computing devices on a local network of a home or business), wide-area networks (e.g., remote computing devices accessible via network connections to remote locations), and/or the Internet 142 (e.g., via networking devices such as routers or gateways that connect to an Internet service provider).

Using the external network connection 140, the source computing device 210 communicates with external network services 144. The external network services 144 are computing resources that that the source computing device 210 can communicate with when sending and/or receiving data.

The sink computing device 220 is a computing device that is only connected to the Miracast peer-to-peer wireless network connection 230 and therefore cannot access the Internet. For example, the sink computing device 220 can be a Miracast dongle or a computing device with built-in Miracast technology for receiving remotely streamed audio and/or video content from the source computing device 210. In some implementations, the sink computing device 220 only has one network interface that only supports the Miracast peer-to-peer wireless network connection 230. In some implementations, the sink computing device 220 has other network interfaces which are not in use.

The sink computing device 220 performs operations to establish and communicate over the secondary stream 234, as depicted at 225 (e.g., via a software and/or firmware component of the sink computing device 220). For example, the sink computing device 220 can receive a request from the source computing device 210 to establish the Miracast peer-to-peer wireless network connection 230 and the primary stream 232 (e.g., using Wi-Fi Direct or another peer-to-peer wireless protocol). The sink computing device 220 can then negotiate the secondary stream 234 over the same Miracast peer-to-peer wireless network connection 230 that the primary stream 232 is using. For example, the sink computing device 220 can connect to a network port at the source computing device 210 that is associated with (e.g., exclusively associated with) the secondary stream 234. The secondary stream 234 can also be established in other ways (e.g., the source computing device 210 and/or sink computing device 220 can advertise support for the secondary stream 234 and receive a connection request from the other side).

Once the secondary stream 234 has been negotiated, the sink computing device 220 can use it to access the external network services 144 via the external network connection 140 of the source computing device 210. In order to provide the access, the source computing device 210 performs relay and/or proxy operations over the external network connection 140 for requests from the sink computing device 220 received via the secondary stream 234, as depicted at 215 (e.g., via a software and/or firmware component of the source computing device 210). As an example, the sink computing device 220 can send a request to the source computing device 210 over the secondary stream 234 to an NTP server on the Internet (one of the external network services 144). The source computing device 210 can relay or proxy the request to the NTP server, receive a response from the NTP server, and relay or proxy the response back to the sink computing device 220 via the secondary stream 234.

Figure 3:
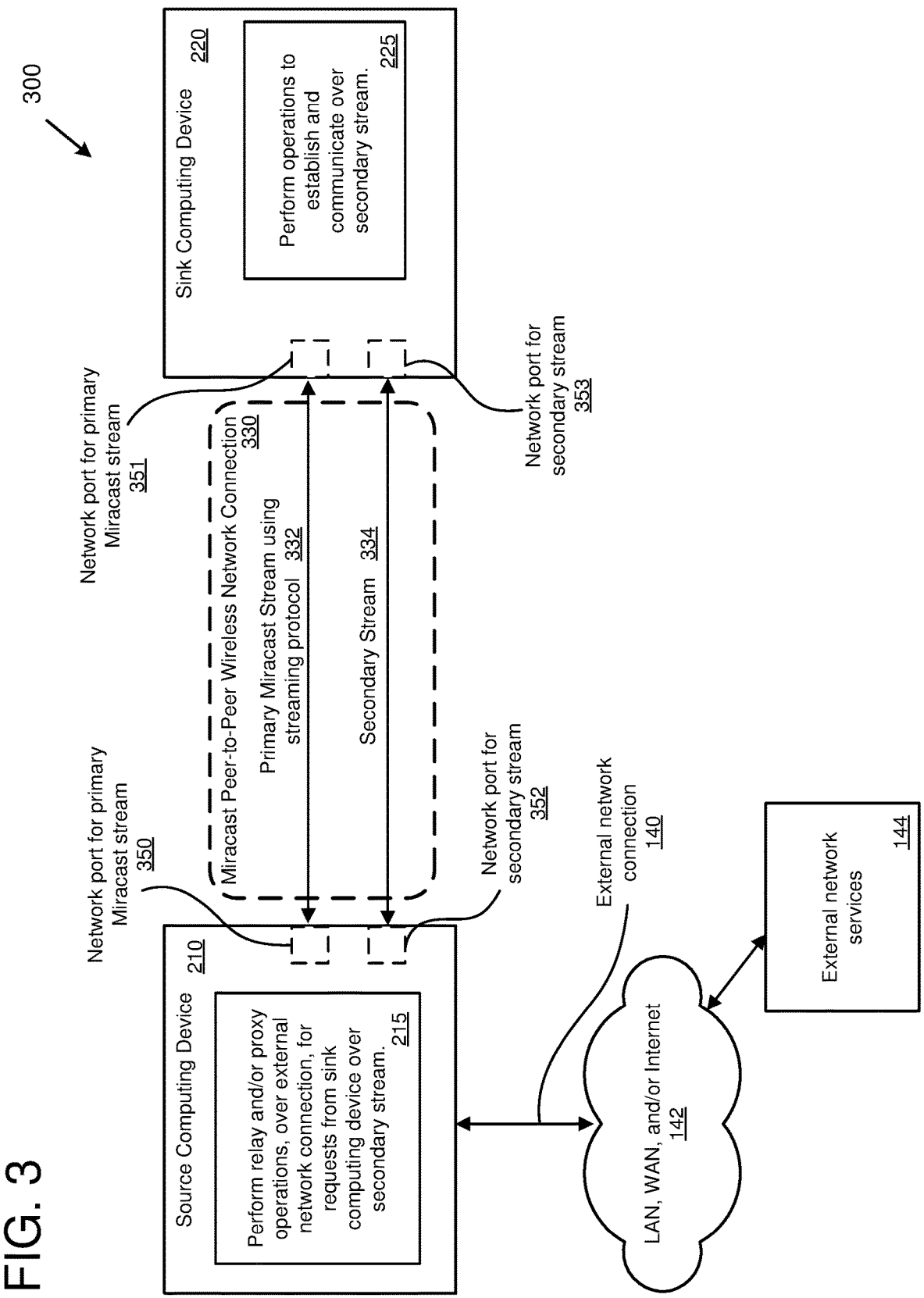
FIG. 3 is diagram depicting an example Miracast peer-to-peer wireless network connection between two computing devices supporting relay and/or proxy operations over a secondary stream using separate network ports.

FIG. 3 is a diagram 300 depicting an example Miracast peer-to-peer wireless network connection between two computing devices supporting relay and/or proxy operations over a secondary stream using separate network ports. In the diagram 300, the source computing device 210 is connected to the sink computing device 220 via a Miracast peer-to-peer wireless network connection 330. The Miracast peer-to-peer wireless network connection 330 is initially established with a primary Miracast stream 332 for streaming audio and/or video content from the source computing device 210 to the sink computing device 220 using a streaming protocol (e.g., real time streaming protocol (RTSP) and real time transport protocol (RTP)). The primary Miracast stream 332 is established between corresponding network ports at the source computing device (indicated at 350) and the sink computing device (indicated at 351). For example, the network ports 350 and 351 for the primary Miracast stream 332 can be transmission control protocol (TCP) network ports and/or user datagram protocol (UDP) network ports.

In addition to the primary Miracast stream 332, a secondary stream 334 is negotiated between the source computing device 210 and the sink computing device 220. The secondary stream 334 is not a Miracast stream (it does not carry Miracast streaming audio and/or video content). The secondary stream 334 is established over a different set of network ports 352 and 353 from the network ports 350 and 351 used by the primary Miracast stream 332. The network ports 352 and 353 can be TCP and/or UDP network ports.

In order to establish the secondary stream 334, the source computing device 210 and/or the sink computing device 220 can listen on a known network port number (e.g., a pre-configured network port or ports that the source computing device 210 and/or the sink computing device 220 have been configured to listen on). The source computing device 210 and/or the sink computing device 220 can then initiate the secondary stream 334 by sending a network connection request to the other side on the known port number (or numbers). As an example, the source computing device 210 can be pre-configured to listen on TCP port number 30,000 for network connection requests from the sink computing device 220.

In order to establish the secondary stream 334, the source computing device 210 and/or the sink computing device 220 can also advertise (e.g., broadcast) the capability of supporting the secondary stream 334. For example, the advertisement can be performed by broadcasting on a particular network port or ports which is monitored by the other side.

In some implementations, in order to establish the secondary stream 334, the source computing device 210 and/or the sink computing device 220 use Wi-Fi Direct discovery services (a standard for advertising and discovery provided by the Wi-Fi Alliance). For example, Wi-Fi Direct discovery services can be used to advertise availability of the secondary stream.

In some implementations, the computing device with the external network connection (e.g., first computing device 110 or source computing device 210) operates in a relay mode to provide access for the other computing device at the other end of the peer-to-peer wireless network connection (e.g., second computing device 120 or sink computing device 220). In relay mode, the computing device with the external network connection receives data (e.g., network packets) via the secondary data channel and forwards the data to the external network services (e.g., to servers on the Internet). In some implementations, the computing device with the external network connection provides a direct network channel for network traffic in both directions (from the other computing device to the external network service and back). For example, the other computing device can send network packets directly to a web server (e.g., via a hypertext transfer protocol (HTTP)) and receive data in a response. Providing a direct open channel to network services allows the computing device at the other end of the peer-to-peer wireless network connection to access any desired network services (e.g., any desired network services on the Internet).

In some implementations, the computing device with the external network connection (e.g., first computing device 110 or source computing device 210) operates in a proxy mode to provide access for the other computing device at the other end of the peer-to-peer wireless network connection (e.g., second computing device 120 or sink computing device 220). In proxy mode, the computing device with the external network connection receives a request from the other computing device via the secondary data channel and sends the request to an external network service. The computing device with the external network connection can receive a response to the request from the external network service and forward the response back to the other computing device via the secondary data channel. In proxy mode, various processing and filtering operations can be performed on the request. For example, a request for a particular network service can be formatted and encapsulated (e.g., from a simplified data format used for communication via the secondary data channel) in network packets for sending to the Internet. In some implementations, only specific types of requests are supported. For example, only specific network resources may be accessible (e.g., only firmware update services) via the secondary data channel. By limiting or filtering the type of requests, additional security can be provided (e.g., instead of opening a direct network connection to the Internet that allows any type of traffic). For example, the computing device with the external network connection can be configured to support one or more specific types of requests from the computing device at the other end of the peer-to-peer wireless network connection (e.g., only NTP and firmware update request).

Figure 4:
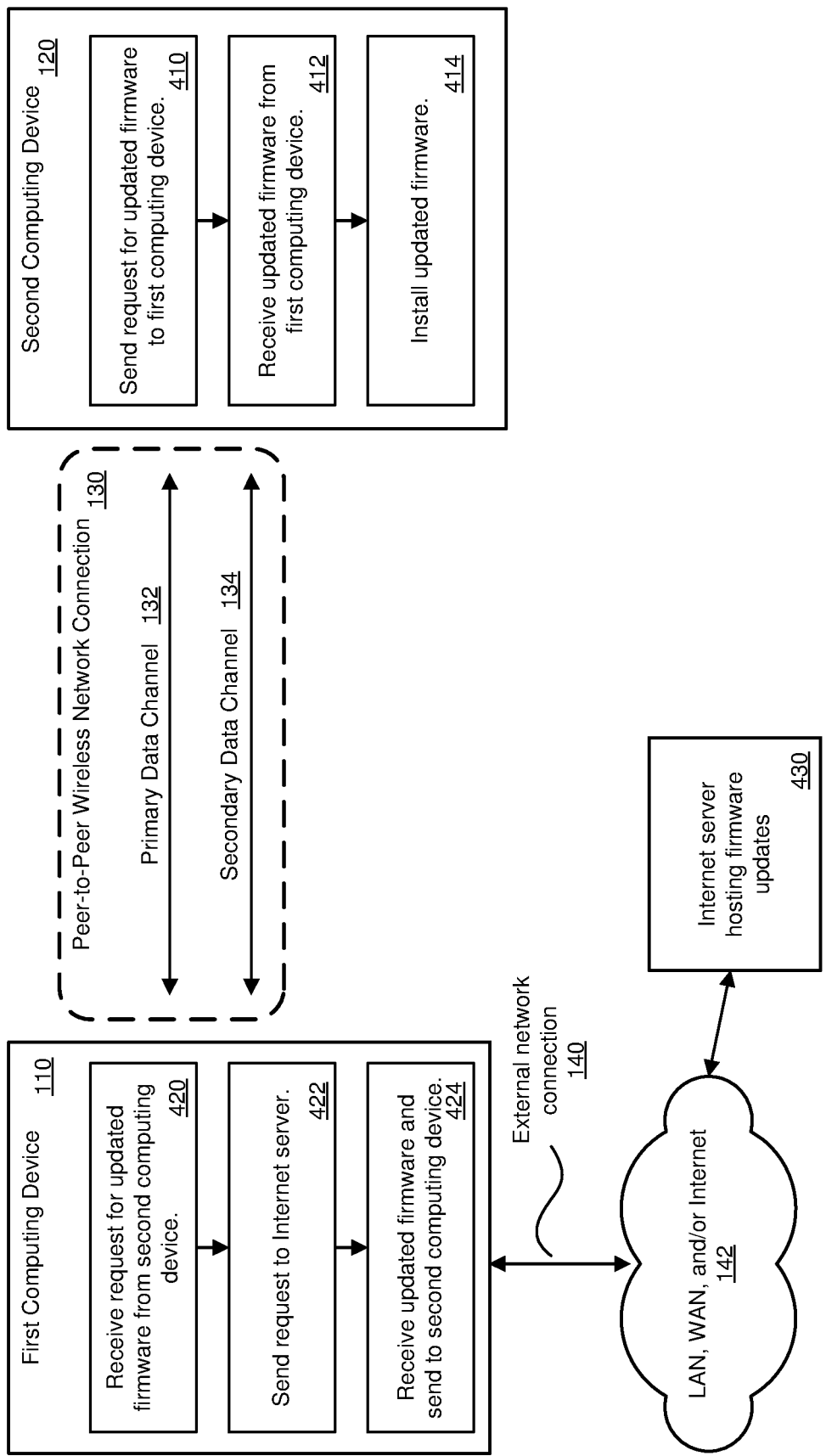
FIG. 4 is diagram depicting an example peer-to-peer wireless network connection between two computing devices supporting firmware updates.

FIG. 4 is a diagram 400 depicting an example peer-to-peer wireless network connection between two computing devices supporting firmware updates. In the diagram 400, the first computing device 110 is connected to the second computing device 120 via the peer-to-peer wireless network connection 130. As depicted in the diagram 400, the first computing device 110 and second computing device 120 perform a number of operations to update the firmware at the second computing device 120. Specifically, the second computing device 120 sends a request for updated firmware to the first computing device 110 via the secondary data channel 134, as depicted at 410. The first computing device 110 receives the request from the second computing device 120 via the secondary data channel 134, as depicted at 420. The first computing device 110 sends the request for updated firmware to a server on the Internet (depicted at 430) via the external network connection 140, as depicted at 422. For example, the first computing device 110 can be a proxy for the request by forwarding the request to the Internet server (e.g., identified by a URL in the request received form the second computing device 120). The first computing device 110 can also act as a relay (e.g., providing an open communication channel for packets to traverse the first computing device 110 to the Internet server 430).

In response to the request for updated firmware, the first computing device 110 receives the updated firmware from the Internet server 430 and sends the updated firmware to the second computing device 120 via the secondary data channel 134, as depicted at 424. For example, the first computing device 110 can receive the updated firmware in a proxy mode or a relay mode. The second computing device 120 receives the updated firmware from the first computing device 110 via the secondary data channel 134, as depicted at 412. The second computing device 120 then installs the updated firmware, as depicted at 414.

In some implementations, the second computing device 120 can perform additional and/or different operations than those depicted. For example, the second computing device 120 can first send a request to the Internet server 430 (via the secondary data channel 134 and first computing device 110) to check and see if an updated firmware is available (e.g., by sending a current firmware version of the second computing device 120). If a response from the Internet server 430 indicates that an updated firmware is available, then the depicted operations can be performed to retrieve and install the updated firmware.

The operations depicted in the diagram 400 can be performed automatically and without user intervention. For example, the second computing device 120 can perform the depicted operations 410, 412, and 414, and the first computing device 110 can perform operations 420, 422, and 424, automatically and without user intervention. In some implementations, the firmware update operations are performed automatically and without user intervention upon establishment of the peer-to-peer wireless network connection 130 and/or upon occurrence of another event (e.g., on a periodic basis or when the primary data channel 132 is not actively being used). In some implementations, the second computing device 120 downloads the update firmware but delays installation of the updated firmware until the peer-to-peer wireless network connection 130 is closed (e.g., to avoid interference with activity using the primary data channel 132). In some implementations, the second computing device 120 is a Miracast sink device that automatically reboots into a servicing mode to update its firmware once it has been downloaded (e.g., as soon as the update is downloaded or at a later time, such as when the peer-to-peer wireless network connection 130 is closed).

Providing a way to update firmware (or other software) of a computing device that does not have access to external networks (e.g., the Internet) can provide benefits in terms of security, stability, and performance. For example, updated firmware can provide fixes for bugs, security holes, and/or performance issues. In addition, firmware can be updated in an automated manner, and without user intervention, when the second computing device connects via the peer-to-peer wireless network connection (e.g., the second computing device can automatically check for, and download and install, updated firmware or other software automatically upon negotiating the secondary data channel).

Any of the technologies and features described in FIGS. 1, 2, 3, and 4 can be used separately or in combination. For example, the computing devices discussed above in FIGS. 1, 2, and 4 can use the network port, advertising, and/or discovery techniques discussed with regard to FIG. 3.

The first computing device (e.g., source computing device) and second computing device (e.g., sink computing device) communicate over the secondary data channel (e.g., secondary stream) of the peer-to-peer wireless network connection to perform a variety of tasks. For example, the second computing device can access a network server via the secondary data channel and first computing device to obtain updated drivers, firmware, and/or other software. As another example, the second computing device can access a network time service (e.g., NTP) on the Internet to update the current time of the second computing device (e.g., to maintain time synchronization with the first computing device). As another example, the second computing device can send data to an Internet server (e.g., diagnostic or usage information, which can be encrypted and/or anonymized). As another example, the second computing device can receive data from an Internet server (e.g., retrieve advertisements or other data for display at the second computing device).

Methods for Secondary Data Channels Over Peer-to-Peer Wireless Network Connections In the technologies described herein, methods can be provided supporting communication using secondary data channels over peer-to-peer wireless network connections between computing devices. For example, a first computing device can establish a peer-to-peer wireless network connection with a second computing device. Primary and secondary data channels can be created over the peer-to-peer wireless network connection. The first computing device can perform relay and/or proxy operations for network service requests from the second computing device over the secondary data channel. Various operations can be performed automatically and without user intervention. For example, the computing devices can automatically negotiate the secondary data channel (e.g., in response to the peer-to-peer wireless network connection being established), requests (and responses to the requests) can be automatically sent between the computing devices, and the first computing device can automatically relay and/or proxy requests (and responses).

Figure 5:
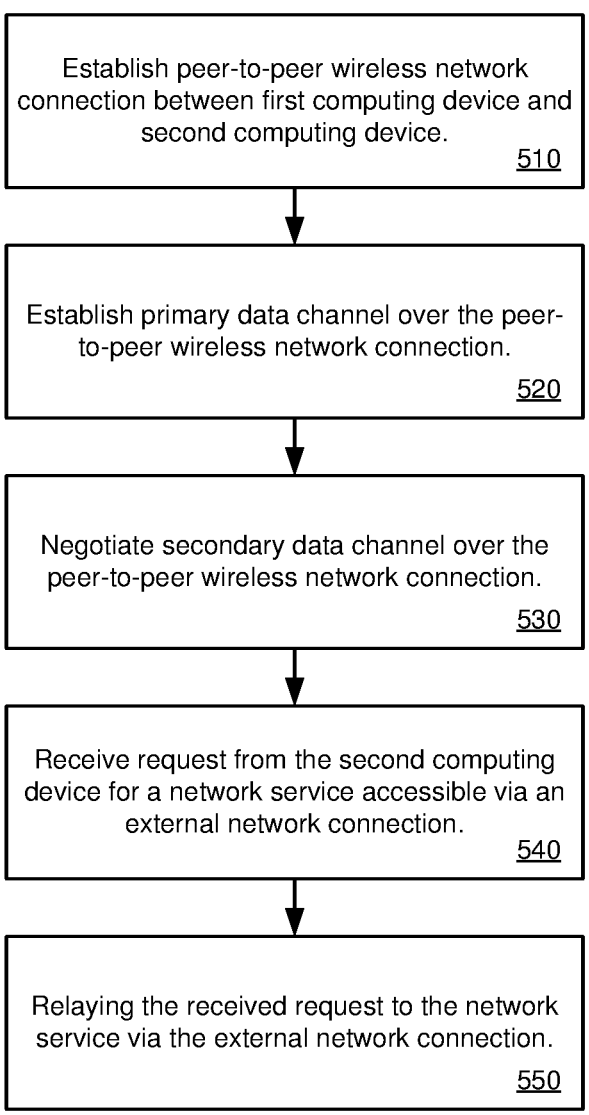
FIG. 5 is a flowchart of an example method for providing network services over peer-to-peer wireless network connections.

FIG. 5 is a flowchart of an example method 500 for providing network services over peer-to-peer wireless network connections. The example method 500 is performed by a first computing device that has both a peer-to-peer wireless network connection and an external network connection to external network services (e.g., the Internet). For example, the example method 500 can be performed by the first computing device 110 or the source computing device 210. At 510, a peer-to-peer wireless network connection is established between the first computing device and a second computing device. For example, the first computing device can be a Miracast source computing device, the second computing device can be a Miracast sink computing device, and the peer-to-peer wireless network connection can be a Miracast connection.

At 520, a primary data channel is established over the peer-to-peer wireless network connection between the first computing device and the second computing device. For example, the primary data channel (e.g., primary stream) can be a Miracast stream for streaming audio and/or video data from the first computing device for display or playback at the second computing device.

At 530, a secondary data channel (e.g., secondary stream) is negotiated over the peer-to-peer wireless network connection (the same peer-to-peer wireless network connection that the primary data channel uses). For example, the negotiation can involve the first computing device connecting to the second computing device (e.g., by the second computing device listening on a specific network port, such as a pre-configured port number) and/or the second computing device connecting to the first computing device (e.g., by the first computing device listening on a specific port, such as a pre-configured port number). In some implementations, the port (or ports) used by the secondary data channel are different from the port (or ports) used by the primary data channel.

At 540, a request is received by the first computing device from the second computing device over the secondary data channel. The request is for a network service accessible via an external network connection of the first computing device.

At 550, the first computing device relays the received request to the network service via the external network connection. The first computing device can receive a response to the request from the network service and send the response back to the second computing device via the secondary data channel. In some situations, the first computing may not receive a response to the request (e.g., the request may just transmit data to an Internet server, such as diagnostic information, without the need for a response). In some implementations, the first computing device operates in a relay mode, but the first computing device can also operate in a proxy mode.

Figure 6:
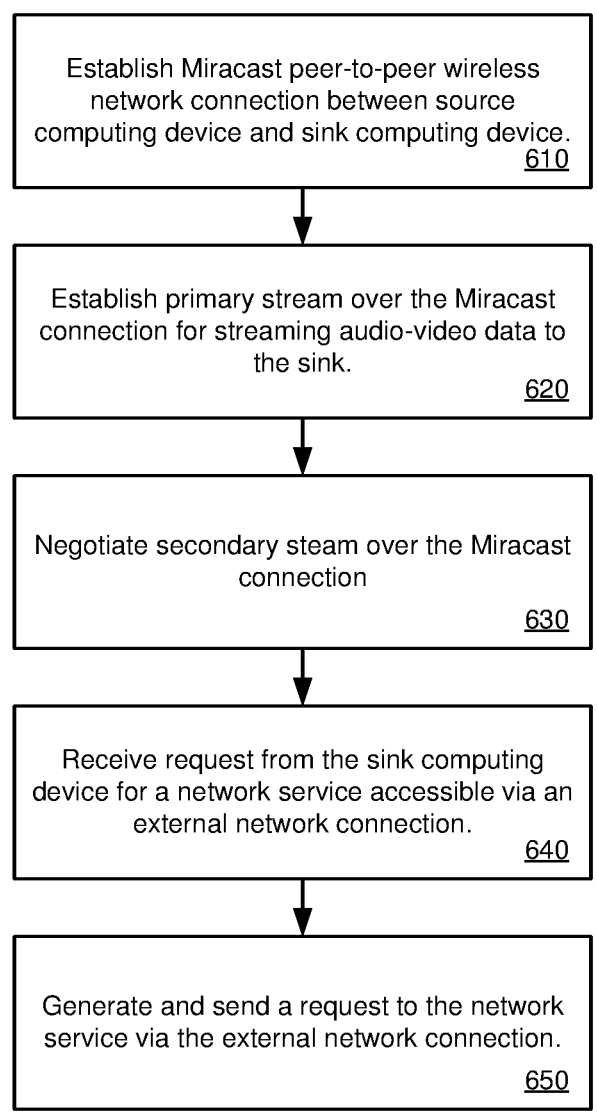
FIG. 6 is a flowchart of an example method for providing network services over Miracast peer-to-peer wireless network connections.

FIG. 6 is a flowchart of an example method 600 for providing network services over peer-to-peer wireless network connections. The example method 600 is performed by a source computing device that has both a Miracast peer-to-peer wireless network connection and an external network connection to external network services (e.g., the Internet). For example, the method 600 can be performed by the source computing device 210. At 610, a Miracast peer-to-peer wireless network connection is established between the source computing device and a sink computing device (e.g., sink computing device 220). For example, the sink computing device can be a Miracast dongle or a Miracast enabled display (e.g., television).

At 620, a primary stream is established over the Miracast peer-to-peer wireless network connection between the source computing device and the sink computing device. For example, the primary stream can provide streaming audio and/or video data from the source computing device for display or playback at the sink computing device.

At 630, a secondary stream is negotiated over the Miracast peer-to-peer wireless network connection (the same Miracast peer-to-peer wireless network connection that the primary stream uses). For example, the negotiation can involve the source computing device connecting to the sink computing device (e.g., by the sink computing device listening on a specific network port, such as a pre-configured port number) and/or the sink computing device connecting to the source computing device (e.g., by the source computing device listening on a specific port, such as a pre-configured port number). In some implementations, the port (or ports) used by the secondary stream are different from the port (or ports) used by the primary stream.

At 640, a request is received by the source computing device from the sink computing device over the secondary stream. The request is for a network service accessible via an external network connection of the source computing device.

At 650, the source computing device generates and sends a request (based on the received request from the sink computing device) to the network service via the external network connection. The source computing device can receive a response to the request from the network service and send the response back to the sink computing device via the secondary stream. In some situations, the source computing may not receive a response to the request (e.g., the request may just transmit data to an Internet server, such as diagnostic information, without the need for a response). In some implementations, the source computing device operates in a proxy mode, but the source computing device can also operate in a relay mode.

Figure 7:
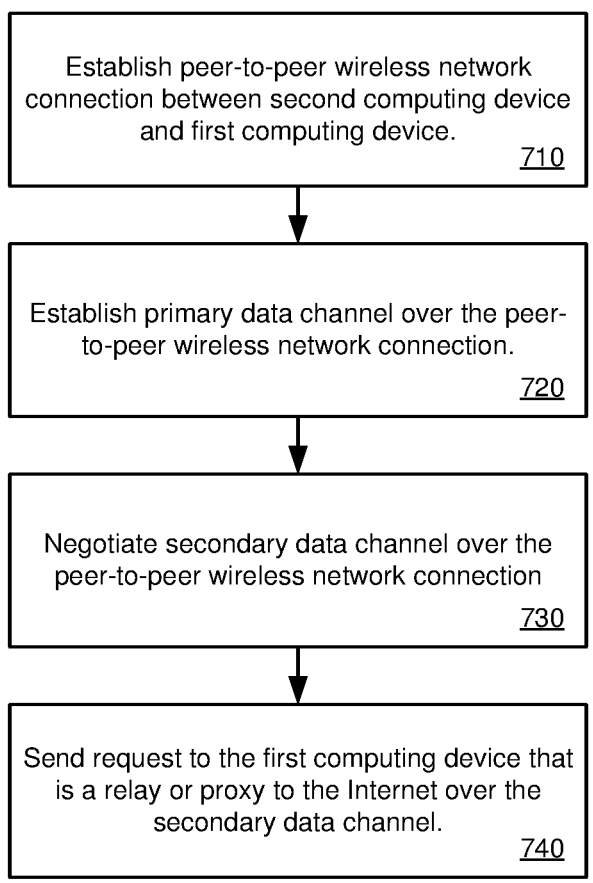
FIG. 7 is a flowchart of an example method for accessing network services over peer-to-peer wireless network connections.

FIG. 7 is a flowchart of an example method 700 for accessing network services over peer-to-peer wireless network connections. The example method 700 is performed by a second computing device that has a peer-to-peer wireless network connection but has no Internet access. For example, the method 700 can be performed by the second computing device 120 or the sink computing device 220. At 710, a peer-to-peer wireless network connection is established between the second computing device and a first computing device (e.g., first computing device 110 or the source computing device 210). For example, the second computing device can be a Miracast sink computing device, the first computing device can be a Miracast source computing device, and the peer-to-peer wireless network connection can be a Miracast connection.

At 720, a primary data channel is established over the peer-to-peer wireless network connection between the second computing device and the first computing device. For example, the primary data channel (e.g., primary stream) can be a Miracast stream that is received by the second computing device from the first computing device containing audio and/or video content for display or playback at the second computing device.

At 730, a secondary data channel (e.g., secondary stream) is negotiated over the peer-to-peer wireless network connection (the same peer-to-peer wireless network connection that the primary data channel uses). For example, the negotiation can involve the first computing device connecting to the second computing device (e.g., by the second computing device listening on a specific network port, such as a pre-configured port number) and/or the second computing device connecting to the first computing device (e.g., by the first computing device listening on a specific port, such as a pre-configured port number). In some implementations, the port (or ports) used by the secondary data channel are different from the port (or ports) used by the primary data channel.

At 740, a request is sent by the second computing device to the first computing device over the secondary data channel for a network service accessible by the first computing device. The first computing device is a relay and/or proxy to external networks (e.g., to the Internet) for the second computing device. The second computing device can receive a response to the request from the first computing device over the secondary data channel (e.g., the first computing device can receive the response from the network service and transmit it back to the second computing device). In some situations, the second computing may not receive a response to the request (e.g., the request may just transmit data to an Internet server, such as diagnostic information, without the need for a response).

Example Embodiments and Alternatives

Any of the technologies and features described herein can be used separately or in combination. For example components described in one embodiment can be included in other embodiments and vice versa. The following paragraphs are non-limiting examples of such combinations. In addition, the example embodiments can be implemented in the context of computing devices, methods, and/or computer-readable storage media.

In a first example embodiment, a first computing device comprises a processing unit and memory, the processing unit executing computer instructions performing operations for providing network services over peer-to-peer wireless network connections, the operations comprising: establishing a peer-to-peer wireless network connection between the first computing device and a second computing device, wherein the second computing device only supports the peer-to-peer wireless network connection and has no Internet access; establishing a primary data channel over the peer-to-peer wireless network connection; negotiating a secondary data channel over the peer-to-peer wireless network connection between the first computing device and the second computing device; receiving a request from the second computing device for a network service accessible via an external network connection of the first computing device; and relaying the received request to the network service via the external network connection. In some examples, the peer-to-peer wireless network connection is established using the Wi-Fi Direct standard. In some examples, the peer-to-peer wireless network connection is a Miracast network connection, and wherein the primary data channel is a Miracast data channel for streaming audio-video data from the first computing device to the second computing device. In some examples, the first network device is a Miracast source and the second computing device is a Miracast sink. In some examples, negotiating the secondary data channel over the peer-to-peer wireless network connection comprises: receiving a network connection from the second computing device at a network port of the first computing device associated with the secondary data channel. In some examples, negotiating the secondary data channel over the peer-to-peer wireless network connection comprises: sending a network connection request to a network port at the second computing device, wherein the network port is a pre-configured network port associated with the secondary data channel. In some examples, negotiating the secondary data channel over the peer-to-peer wireless network connection comprises: advertising availability of the secondary data channel to the second computing device; and receiving a network connection request from the second computing device to establish the secondary data channel. In some examples, negotiating the secondary data channel over the peer-to-peer wireless network connection comprises: receiving, from the second computing device, a broadcast indicating availability of the secondary data channel; and sending, to the second computing device, a network connection request to establish the secondary data channel. In some examples, the external network connection comprises an Internet connection. In some examples, the request for the network service is a request for an updated firmware for the second computing device, and wherein the updated firmware is received and installed by the second computing device automatically and without user intervention.

In a second example embodiment, which can be implemented independently or in combination with some or all of the first embodiment, a method, implemented by a source computing device, for providing network services over peer-to-peer wireless network connections, comprises: establishing a Miracast peer-to-peer wireless network connection between the source computing device and a sink computing device, wherein the sink computing device only supports the Miracast peer-to-peer wireless network connection and has no Internet access; establishing a primary stream over the Miracast peer-to-peer wireless network connection, wherein the primary stream is a Miracast stream for streaming audio-video data from the source computing device to the sink computing device; negotiating a secondary stream over the Miracast peer-to-peer wireless network connection between the source computing device and the sink computing device, wherein the secondary stream is not a Miracast stream; receiving a request from the sink computing device for a network service accessible via an external network connection of the source computing device; and based on the received request, generating and sending a request to the network service via the external network connection. In some examples, the source computing device is a proxy for network service requests from the sink computing device to network services accessible via the external network connection of the source computing device. In some examples, the method further comprises: receiving a response from the network service; and sending the response to the sink computing device. In some examples, the method further comprises: advertising availability of the secondary stream comprising listening on a network port associated with the secondary stream at the source computing device, wherein the network port is different from network ports used by the primary stream; and receiving a network connection request at the network port from the sink computing device to establish the secondary data channel. In some examples, the external network connection is a connection to the Internet, wherein the request for the network service is a request for an updated firmware for the sink computing device, wherein the request for the updated firmware comprises a uniform resource locator (URL) and wherein the updated firmware is received and installed by the sink computing device automatically and without user intervention.

In a third example embodiment, which can be implemented independently or in combination with some or all of the first and/or second embodiments, a second computing device comprises: a processing unit; memory; and a wireless network interface capable of only peer-to-peer wireless network connections; the processing unit executing computer instructions performing operations for accessing network services over peer-to-peer wireless network connections, the operations comprising: establishing a peer-to-peer wireless network connection between the second computing device and a first computing device, wherein the second computing device only supports the peer-to-peer wireless network connection and has no Internet access; establishing a primary data channel over the peer-to-peer wireless network connection; negotiating a secondary data channel over the peer-to-peer wireless network connection between the second computing device and the first computing device;

sending a request to the first computing device for a network service on the Internet, wherein the first computing device is a relay or proxy to the Internet for the request. In some examples, the peer-to-peer wireless network connection is a Miracast network connection, and wherein the primary data channel is a Miracast data channel for streaming audio-video data that is received by the second computing device from the first computing device, wherein the second network device is a Miracast sink and the first computing device is a Miracast source. In some examples, negotiating the secondary data channel over the peer-to-peer wireless network connection comprises: sending, by the second computing device, a network connection request to a network port at the first computing device, wherein the network port is a pre-configured network port associated with the secondary data channel, and wherein the network port is different from network ports used by the primary data channel. In some examples, the request for the network service is a request to a server on the Internet for an updated firmware for the second computing device, the operations further comprising: receiving, from the first computing device, the updated firmware in response to the request; and installing, by the second computing device, the updated firmware, wherein the updated firmware is received and installed by the second computing device automatically and without user intervention. In some examples, the second computing device is a Miracast dongle or a Miracast enabled display device.

Computing Systems

Figure 8:
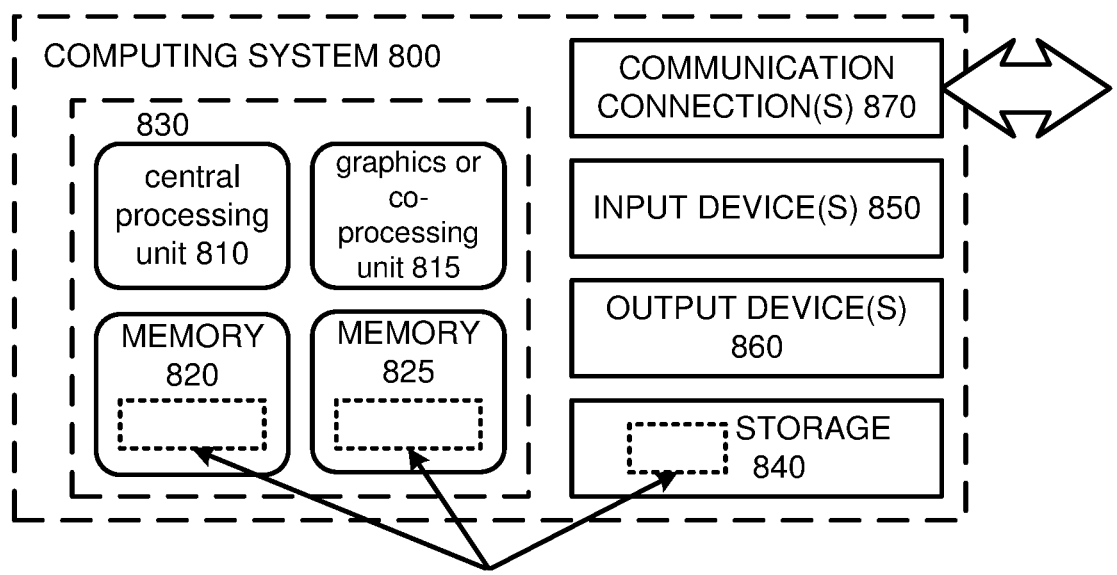
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 9:
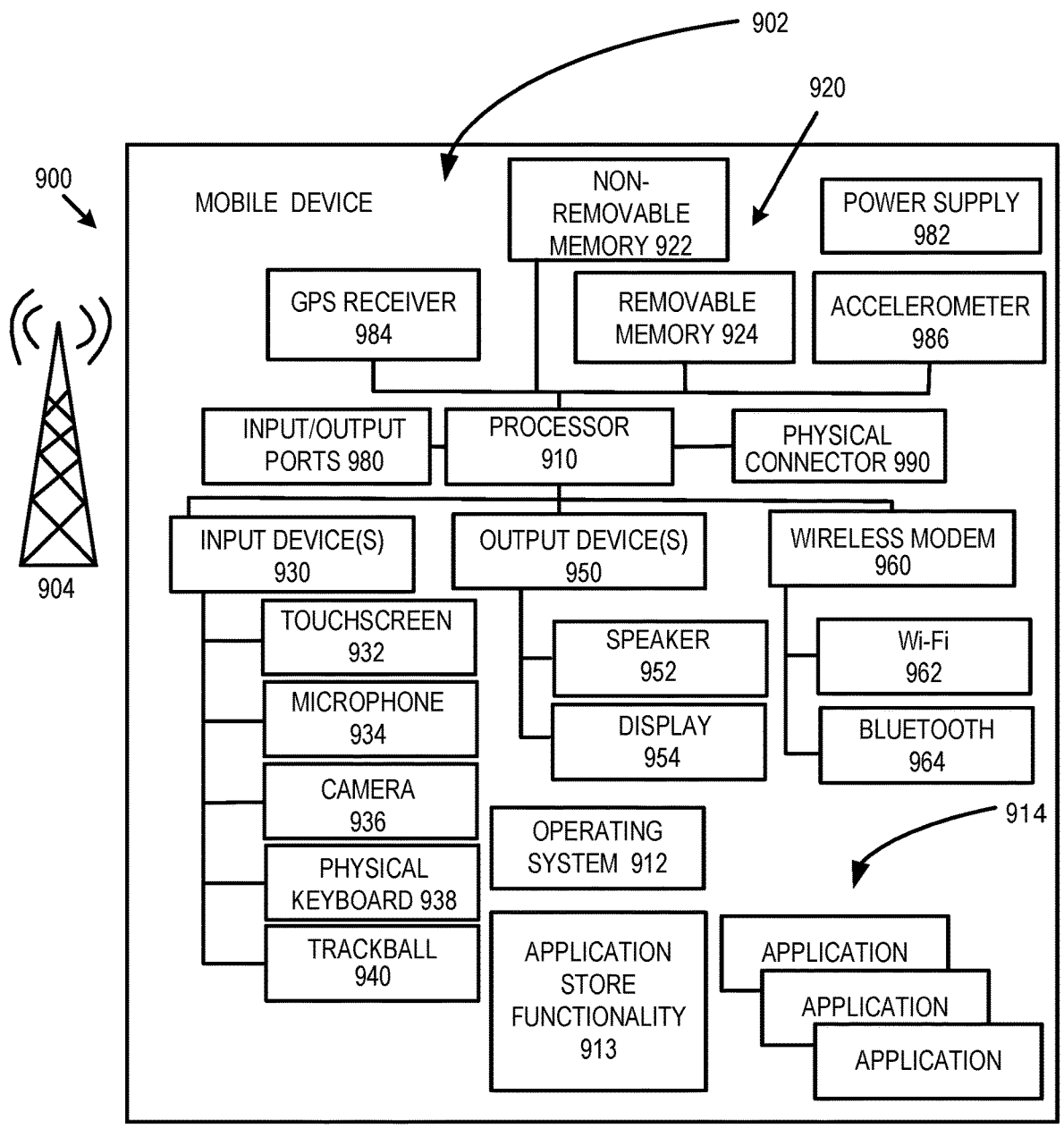
FIG. 9 is an example mobile device that can be used in conjunction with the technologies described herein.

FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs can include common mobile computing applications (e.g., email applications, calendars, contact managers, web browsers, messaging applications), or any other computing application. Functionality 913 for accessing an application store can also be used for acquiring and updating application programs 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as "smart cards." The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touchscreen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

The input devices 930 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 912 or applications 914 can comprise speech-recognition software as part of a voice user interface that allows a user to operate the device 900 via voice commands. Further, the device 900 can comprise input devices and software that allows for user interaction via a user's spatial gestures, such as detecting and interpreting gestures to provide input to a gaming application.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM network for data and voice communications within a single cellular network, between cellular networks, or between the mobile device and a public switched telephone network (PSTN).

The mobile device can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. By way of example and with reference to FIG. 9, computer-readable storage media include memory and storage 920, 922, and 924. The term computer-readable storage media does not include signals and carrier waves. In addition, the term computer-readable storage media does not include communication connections, such as 870, 960, 962, and 964.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method, implemented by a source computing device, for providing network services over peer-to-peer wireless network connections, the method comprising:
    establishing a Miracast peer-to-peer wireless network connection between the source computing device and a sink computing device, wherein the sink computing device only supports the Miracast peer-to-peer wireless network connection and has no Internet access;
    establishing a primary data channel over the Miracast peer-to-peer wireless network connection, wherein the primary data channel is a Miracast data channel for streaming audio-video data from the source computing device to the sink computing device;
    advertising availability of a secondary data channel comprising listening on a network port associated with the secondary data channel at the source computing device, wherein the network port is different from network ports used by the primary stream;
    receiving a network connection request at the network port from the sink computing device to establish the secondary data channel;
    negotiating the secondary data channel over the Miracast peer-to-peer wireless network connection between the source computing device and the sink computing device for non-audio-video data, wherein the secondary data channel is not a Miracast stream;
    receiving a request from the sink computing device for a network service accessible via an external network connection of the source computing device; and
    based on the received request, generating and sending a request to the network service via the external network connection;
    receiving a response from the network service; and
    sending the response to the sink computing device via the secondary stream.

2. The method of claim 1 wherein the source computing device is a proxy for network service requests from the sink computing device to network services accessible via the external network connection of the source computing device.

3. The method of claim 1 wherein the external network connection is a connection to the Internet, wherein the request for the network service is a request for an updated firmware for the sink computing device, wherein the request for the updated firmware comprises a uniform resource locator (URL) and wherein the updated firmware is received and installed by the sink computing device automatically and without user intervention.

4. A first computing device comprising:
    a processing unit; and
    memory;
    the processing unit executing computer instructions performing operations for providing network services over a Miracast wireless network connection, the operations comprising:
        establishing a Miracast peer-to-peer wireless network connection between the first computing device and a second computing device, wherein the second computing device only supports the Miracast wireless network connection and has no Internet access;
        establishing a primary data channel over the Miracast wireless network connection for streaming audio-video data from the first computing device to the second computing device;
        advertising availability of a secondary data channel comprising listening on a network port associated with the secondary data channel at the first computing device, wherein the network port is different from network ports used by the primary data channel;
        receiving a network connection request at the network port from the second computing device to establish the secondary data channel;
        negotiating the secondary data channel over the Miracast wireless network connection between the first computing device and the second computing device, the secondary data channel being a two-way data channel for non-audio-video data;
        receiving a request on the secondary data channel from the second computing device for a network service accessible via an external network connection of the first computing device; and
        relaying the received request to the network service via the external network connection.

5. The computing device of claim 4 wherein the peer-to-peer wireless network connection is established using the Wi-Fi Direct standard.

6. The computing device of claim 4 wherein the first computing device is a Miracast source and the second computing device is a Miracast sink.

7. The computing device of claim 4 wherein negotiating the secondary data channel over the peer-to-peer wireless network connection comprises:
sending a network connection request to a network port at the second computing device, wherein the network port is a pre-configured network port associated with the secondary data channel.

8. The computing device of claim 4 wherein negotiating the secondary data channel over the peer-to-peer wireless network connection comprises:
receiving, from the second computing device, a broadcast indicating availability of the secondary data channel; and
sending, to the second computing device, a network connection request to establish the secondary data channel.

9. The computing device of claim 4 wherein the external network connection comprises an Internet connection.

10. The computing device of claim 4 wherein the request for the network service is a request for an updated firmware for the second computing device, and wherein the updated firmware is received and installed by the second computing device automatically and without user intervention.

11. The first computing device of claim 4, wherein the peer-to-peer connection is a Bluetooth connection.

12. A second computing device comprising:
a processing unit;
memory; and
a wireless network interface capable of only peer-to-peer wireless network connections;
the processing unit executing computer instructions performing operations for accessing network services over peer-to-peer wireless network connections, the operations comprising:
establishing a peer-to-peer wireless network connection between the second computing device and a first computing device, wherein the second computing device only supports the peer-to-peer wireless network connection and has no Internet access;
establishing a primary data channel for streaming audio-video data over the peer-to-peer wireless network connection;
advertising availability of a secondary data channel comprising listening on a network port associated with the secondary data channel at the source computing device, wherein the network port is different from network ports used by the primary stream;
receiving a network connection request at the network port from the sink computing device to establish the secondary data channel;
negotiating the secondary data channel over the peer-to-peer wireless network connection between the second computing device and the first computing device for non-audio-video data;
sending a request to the first computing device for a network service on the Internet, wherein the first computing device is a relay or proxy to the Internet for the request; and
receiving a response from the network service via the secondary data channel.

13. The second computing device of claim 12 wherein the peer-to-peer wireless network connection is a Miracast network connection, and wherein the primary data channel is a Miracast data channel for streaming audio-video data that is received by the second computing device from the first computing device, wherein the second network device is a Miracast sink and the first computing device is a Miracast source.

14. The second computing device of claim 12 wherein negotiating the secondary data channel over the peer-to-peer wireless network connection comprises:
sending, by the second computing device, a network connection request to a network port at the first computing device, wherein the network port is a pre-configured network port associated with the secondary data channel, and wherein the network port is different from network ports used by the primary data channel.

15. The second computing device of claim 12 wherein the request for the network service is a request to a server on the Internet for an updated firmware for the second computing device, the operations further comprising:
receiving, from the first computing device, the updated firmware in response to the request; and
installing, by the second computing device, the updated firmware, wherein the updated firmware is received and installed by the second computing device automatically and without user intervention.

16. The second computing device of claim 12 wherein the second computing device is a Miracast dongle or a Miracast enabled display device.

\* \* \* \* \*